US006827196B2

(12) United States Patent
Wiesinger et al.

(10) Patent No.: US 6,827,196 B2
(45) Date of Patent: Dec. 7, 2004

(54) METHOD FOR STOPPING CONVEYING EQUIPMENT FOR PERSONS

(75) Inventors: Josef Wiesinger, Vienna (AT); Gerhard Stoiber, Gösting (AT)

(73) Assignee: Inventio AG, Hergiswil (CH)

( * ) Notice: Subject to any disclaimer, the term of this patent is extended or adjusted under 35 U.S.C. 154(b) by 8 days.

(21) Appl. No.: 10/328,310

(22) Filed: Dec. 23, 2002

(65) Prior Publication Data

US 2003/0150690 A1 Aug. 14, 2003

(30) Foreign Application Priority Data

Dec. 24, 2001 (EP) ........................................... 01811269

(51) Int. Cl.[7] ............................................... B65G 17/00
(52) U.S. Cl. ....................................... 198/323; 198/322
(58) Field of Search ................................ 198/322, 323, 198/330

(56) References Cited

U.S. PATENT DOCUMENTS 4,664,247 A * 5/1987 Wolf et al. ................. 198/323
5,107,975 A * 4/1992 Iwata ......................... 198/323
6,112,166 A * 8/2000 Joosten ....................... 198/323
6,273,234 B1 8/2001 Balzer-Apke et al.

FOREIGN PATENT DOCUMENTS

DE 198 49 238 C1 3/2000

* cited by examiner

*Primary Examiner*—James R. Bidwell
(74) *Attorney, Agent, or Firm*—Schweitzer Cornman Gross & Bondell LLP

(57) ABSTRACT

The invention relates to a method for stopping conveying equipment for persons, wherein on response of a safety element a braking process performed by a frequency converter co-operating with a drive motor is initiated, by means of which the conveying equipment for persons is brought to a standstill, wherein the braking process is monitored by a safety circuit which comprises at least a first channel and a second channel. The operational safety of the braking system is thereby increased.

8 Claims, 2 Drawing Sheets

METHOD FOR STOPPING CONVEYING EQUIPMENT FOR PERSONS

The invention relates to a method for stopping conveying equipment for persons and to a safety circuit for monitoring the stopping.

BACKGROUND OF THE INVENTION

The use of the term "conveying equipment for persons" herein is to be understood to encompass not only escalators, but also moving walkways.

A method for braking rolling stairs or rolling walkways have become known from DE 198 03 899 C2, in which, on response of a safety element motor, a drive frequency converter is controlled and a braking ramp is activated, by way of which the speed of the step belt or plate belt is brought to a zero value with substantially uniform delay. The holding brake is activated at the instant of standstill of the rolling stairs or the rolling walkway. The frequency converter ensures that the rolling stairs or rolling walkway is braked according to the set braking ramp, wherein monitoring of the braking system takes place in the region of the control. The monitoring of faults in the region of the frequency converter and/or the control is performed by additional safety elements.

In such methodology additional safety elements are not monitored. In the case of the faulty function of an additional safety element the function of the frequency converter and/or the control thus cannot be checked, which can lead to an uncontrollable braking process.

The present invention has an object of proposing a method and a safety circuit which do not have the aforesaid disadvantages and ensures a reliable braking system free of disturbance.

BRIEF DESCRIPTIONS OF THE INVENTION

In accordance with the foregoing and other objects and purposes, the present invention is a method and apparatus for stopping conveying equipment for persons of the type in which a braking process is performed by a frequency converter coupled to a drive motor by which the conveying equipment for persons is brought to a stop or standstill, wherein the braking process is monitored by a drive safety circuit having at least first and second channels.

The presence of at least two channels ensures increased safety. Certain functions of the braking system can be monitored at least twice and independently of one another. The operational safety of the braking system is therefore increased.

Advantageously, the first channel may be provided with a first processor control and the second channel with a second processor control. This has the advantage that the system can be parameterised in simple manner and mutual checking can be carried out by way of a bus system.

Advantageously, the first channel and the second channel monitor one another. This provides a redundant system. If one channel does not function in orderly manner, this is recognized by the other channel. Appropriate safety measures can then be initiated.

All explained features are usable not only in the respectively stated combination, but also in other combinations or by themselves without departing from the scope of the invention.

BRIEF DESCRIPTION OF THE DRAWINGS

The invention is explained in more detail in the following description, accompanied by the annexed drawings, in which.

DETAILED DESCRIPTION OF THE INVENTION

Figure 1:
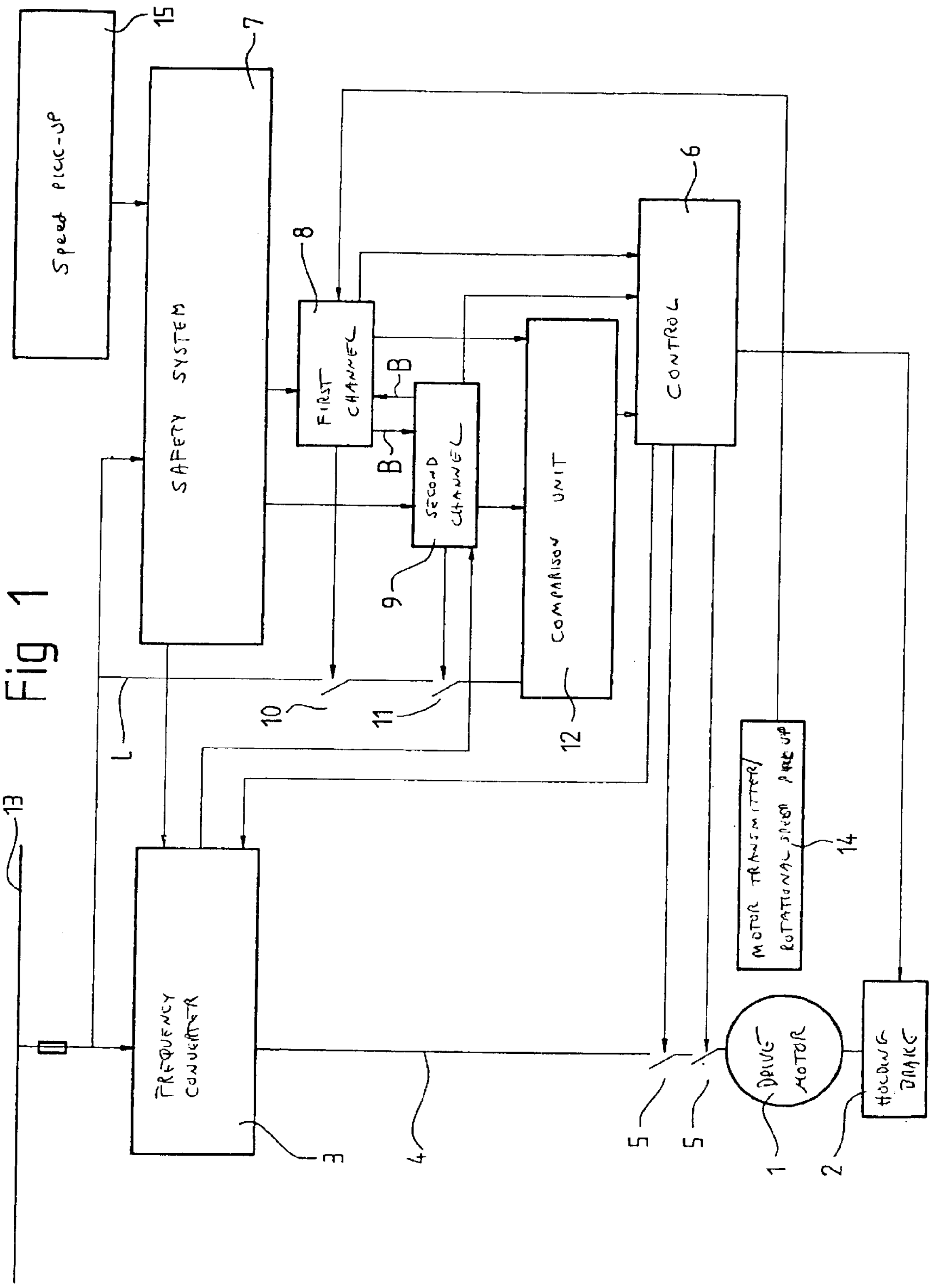
FIG. 1 is a schematic block circuit diagram of a braking system according to the invention.

FIG. 1 is a block circuit diagram of a braking system of the invention for conveying equipment for persons, which is not further illustrated. A drive motor 1 of the conveying equipment for persons is in operative connection with an electromechanical holding brake 2, which is preferably constructed as a shoe brake. A frequency converter 3 is connected by way of a line 4 with two drive circuit breakers which are connected in series and represented schematically by contacts 5. When the drive circuit breakers 5 are closed, the frequency converter 3 acts on the drive motor 1. A control 6 is disposed in operative connection on the one hand with the frequency converter 3 and the drive circuitbreakers 5 and, on the other hand, with the holding brake 2. A safety system 7 can, for example, comprise a safety circuit and/or a safety device to monitor excess speed and unintended reversal of travel direction. The safety system 7 and thus also the safety circuit are in connection with the frequency converter 3 as well as with a drive control circuit, or drive safety circuit. The drive safety circuit comprises a first channel 8 and a second channel 9. The first channel 8 has a first output or drive control circuit breaker, which is represented by the contacts 10, and the second channel 9 has a second output or second drive control circuit breaker, which is represented by the contacts 11. The conditions of the first channel 8 and the second channel 9 are checked against one another by a comparison unit 12. An energy supply 13 supplies the braking system. The frequency converter 3 operates with mains current, for example 380 V.

The drive circuit breakers 5 are activated and deactivated by the control 6. However, activation is possible only when permitted by first channel 8 and second channel 9. This increases operational safety.

The conveying equipment for persons according to the invention has two forms of braking, namely electrical braking and holding brake braking.

Electrical braking is used for operational braking, wherein the drive motor 1 is braked by way of the frequency converter 3 over a set ramp. A graduated, controlled braking, rather than an abrupt braking, takes place. No regulation or control takes place by way of fuzzy logic. During electrical braking the drive circuitbreakers 5 remain in a drive condition. In the case of revision operation, electrical braking is not used. If the electrical braking is interrupted, there is further braking by the holding brake 2. The holding brake 2 is an electromechanical brake, which preferably acts on the motor shaft of the drive motor 1 in a mechanically positive manner. In the case of sole action of the holding brake 2, braked travel as defined in the applicable standards/guidelines is maintained.

Braking by the holding brake 2 occurs under any of the following conditions:

power failure exceeding brake travel during electrical braking response of delay monitoring disturbance in the frequency converter undesired reversal of travel direction (underspeed)

speed exceeding 1.4 times nominal speed falling below a minimum speed at standstill failure of delay monitoring exceeding time excessive response time for the control.

In such revision operation, all braking processes are performed by the holding brake 2.

The drive control circuit, i.e. the drive safety circuit, forms, together with the control 6 and the drive circuitbreakers 5, the drive control. In the case of a stop, the control 6 and the drive circuit breakers remain closed over the time of the electrical braking.

In the revision mode the control of the drive circuit breakers 5 takes place directly from the drive safety circuit by way of a revision table. The drive safety circuit is inactive.

The drive safety circuit is, as already stated, of two-channel form and is active when the drive safety circuit is closed during electrical braking.

The first channel 8 consists of a first processor control which evaluates the state of the safety circuit in the safety system 7 and the state of the second channel 9. When the safety circuit is closed, the first output circuit breaker 10 is in the drive state. If the safety circuit is interrupted, the first output circuit breaker 10 remains in drive until one of the following controls responds:

time control delay control brake travel control speed control undesired reversal of travel direction or excess speed monitoring of the second channel 9

When the first output circuit breaker 10 drops out, the energy feed to the drive circuit breakers 5 is interrupted. The holding brake 2 is activated. The output circuitbreakers 10, 11 act directly on the comparison unit 12 by way of a line L.

By time control it is to be understood that the electrical braking must last only for a predetermined maximum time. This time is exceeded, then the first output circuit breaker 10 is controlled to off or deactivated.

A delay control takes place in that the speed of the drive motor 1 is measured by way of a motor transmitter/rotational speed pick-up 14. After an interruption of the safety circuit the delay of the drive motor 1 is remeasured in a tolerance band. If the tolerance band is exceeded, then the first output circuitbreaker 10 is controlled to off.

Brake travel control is achieved in the manner that the braking travel of the conveying equipment for persons is measured by way of the motor transmitter/rotational speed pick-up 14. If permissible braking travel is exceeded, then the first output circuitbreaker 10 is controlled to off. The detected rotational speed is used for control of the braking process.

Speed control is undertaken by a constant measurement of speed. If the motor speed drops below a predetermined value, then the first output circuitbreaker 10 is controlled to off.

The step belt or plate belt speed of the conveying equipment for persons is measured by a further speed pick-up 15 and examined in the safety system 7.

For recognition of undesired reversal of travel and excess speed the corresponding safety device is integrated in the safety system 7 of the braking system. If this safety device switches off the conveying equipment for persons, the first output circuitbreaker 10 is immediately controlled to off.

Monitoring of the second channel 9 is carried out by the first channel 8 in the following manner:

The condition of second output circuitbreaker 11 is led back through second channel 9 to the first channel 8. The correct switching setting of the second channel 9, in particular the second output circuitbreaker 11, is thereby checked. The term "switching setting" is to be understood to comprise either analog or digital data. For example, digital data may be such as on/off or yes/no, etc. If the second channel 9 switches incorrectly or does not switch in the correct sequence in time, then an error is triggered by the first channel 8 and the conveying equipment for persons is stopped. In addition, the second channel 9 transmits regular reports by way of the bus system B. If these reports are not received by the first channel 8, then the conveying equipment for persons is brought to rest.

The second channel 9 consists of a second processor control which evaluates the state of the drive safety circuit. When the drive safety circuit is closed, the second output circuit breaker 11 is controlled in drive. If the drive safety circuit is interrupted, the second output circuitbreaker 11 remains pulled up in drive until the following controls respond:

time control frequency converter disturbance phase failure undesired reversal of travel direction or excess speed monitoring of the first channel 8

When the second output circuit breaker 11 drops out the energy feed to the drive circuitbreakers 5 is interrupted. The holding brake is activated.

Time control as well as recognition of an undesired reversal of travel direction and excess speed is carried out in the same manner as in the case of the first channel 8, wherein in this case instead of the first output circuitbreaker 10, the second output circuitbreaker 11 is, in a given case, controlled to open or off.

The second channel 9 also monitors the frequency converter 3. If a frequency converter disturbance is recognised, then the second output circuitbreaker 11 is controlled to off.

If a phase failure is recognised by the second channel 9, then the second output circuitbreaker 11 is controlled to off.

The second channel 9 also monitors the first channel 8. The condition of first output circuit breaker 10 is led back through the first channel 8 to the second channel 9. The correct switching setting of the first channel 8, in particular of the first output circuit breaker 10, is thereby checked. If the first channel 8 switches incorrectly or not in the correct sequence in time, then an error is triggered by the second channel 9 and the conveying equipment for persons stopped. In addition, the first channel 8 transmits regular reports by way of the bus system B. If these reports are not received by the second channel 9, then the conveying equipment for persons is stopped.

By virtue of the mutual feedback of the output circuit-breakers 10, 11, each of the channels 8, 9 can thus monitor the switching state of the other channel. Each channel 8, 9 checks independently of the other channel whether the other channel has the correct switching state. In particular, each channel 8, 9 checks the switching state of the output circuitbreaker 10, 11 of the other channel. By monitoring of the switching state it is to be understood that it is not a data comparison, but a check is carried out whether the two channels actually operate. A state monitoring is undertaken. The channels 8, 9 check the braking process, wherein the control and regulation of the braking is carried out by way of the frequency converter. The channels 8, 9 have no direct influence on the frequency converter 3; this takes place by the separate control 6.

The processor controls of the channels 8, 9 are advantageously connected by way of an RS485 bus B and regularly exchange data. If one channel transmits no data or false data, an error is triggered by way of the other channel and the conveying equipment for persons stopped. If data are exchanged on a serial interface, it can be assumed therefrom that the system operates in orderly manner. Other known and proven bus systems, such as for example a LON bus, are also usable. Bus communication is not restricted only to the two channels 8, 9, but can also extend to other components of the entire circuit.

Recognition of interruption of the drive safety circuit is established in the following manner:

The output of the drive safety circuit is taken to two safety circuitbreakers, which are incorporated in the drop-out check of the remaining circuitbreakers and are checked for dropping-out before each initiation of a journey. The switching state is led on the first channel 8 and on the second channel 9. In the case of interruption of the safety circuit, the safety circuit circuitbreakers drop out and activate the electrical braking.

The comparison unit is a unit separate from the channels 8, 9. The comparison unit 12 obtains, by way of an input, data with respect to the switching state of the channels 8, 9, and in particular with respect to the switching state of the output circuitbreakers 10, 11. The comparison takes place independently of the channels 8, 9 and is carried out in a check cycle, which increases safety.

The check cycle of the operating means is carried out by the comparison unit 12 in the following manner:

After the end of a journey or, in the case of interruption of the safety circuit, all circuitbreakers (drive circuitbreakers, circuitbreakers for safety devices, safety circuit circuitbreakers and the drive control circuitbreakers, i.e. the first and the second output circuitbreakers 10, 11) are again controlled to off. A drop-out check of the circuitbreakers is thereby carried out by the comparison unit 12 before each initiation of travel. During initiation of travel the functional integrity of the circuitbreakers is checked and thereafter the control is ready for the next start. A check circuitbreaker, which checks the dropped-out circuitbreakers, must be pulled up for travel initiation and is checked, during the travel, for the dropped-out state.

For initiation of travel the output circuitbreakers must be dropped out. During travel, the output circuitbreakers must be pulled up. After a predetermined time after the end of the braking, both output circuitbreakers must be dropped out. During the braking, the two output circuitbreakers must be pulled up. If an error in this switching sequence is recognised, then the system is switched off and must be further activated by a person.

Figure 2:
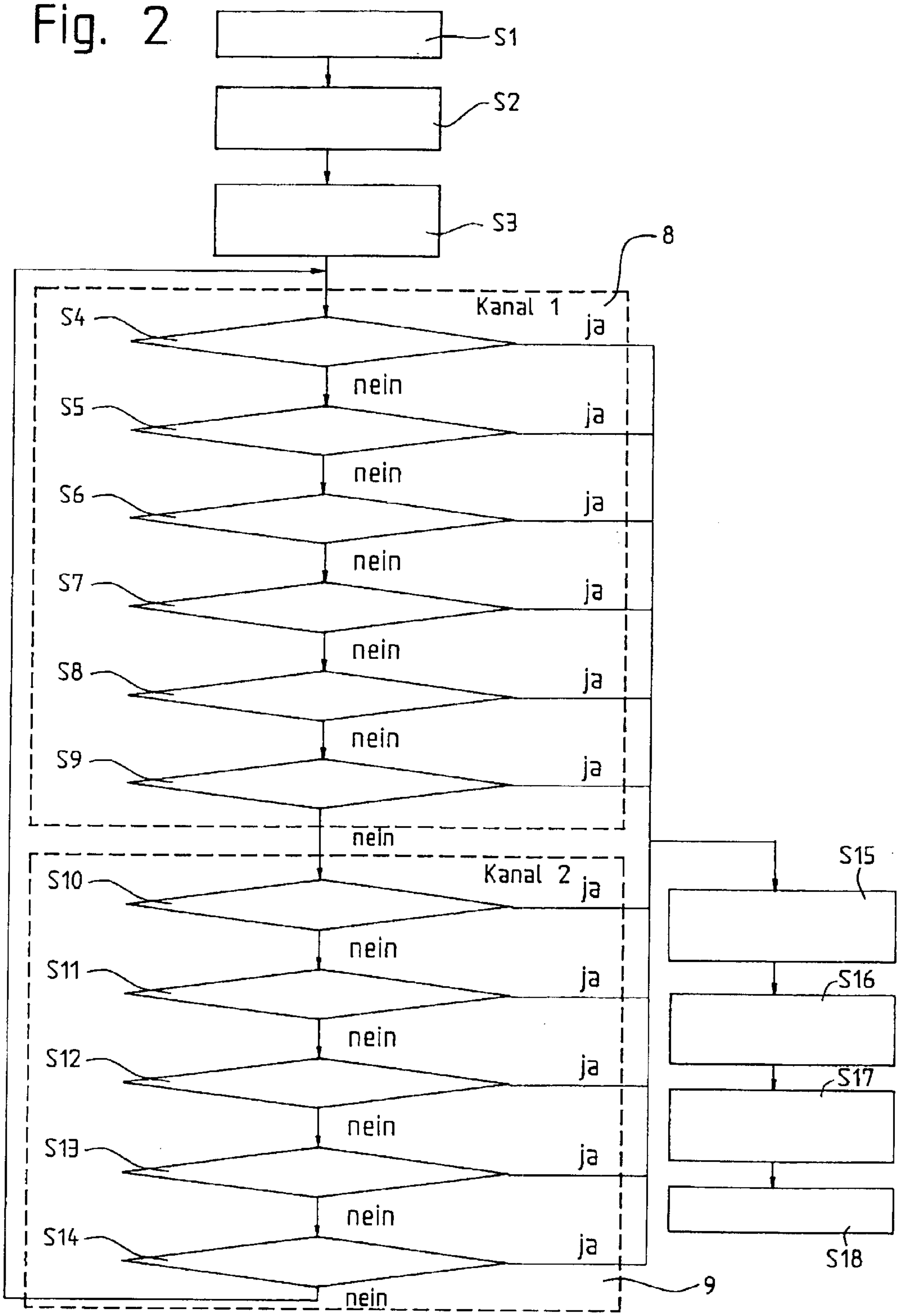
FIG. 2 is a flow chart of an electrical braking system according to the invention.

FIG. 2 shows a flow program of the electrical braking system. The individual steps S1 to S18 are indicated in detail in the following:

| | |
|---|---|
| S1: | conveying equipment for persons runs |
| S2: | safety circuit interruption |
| S3: | stop command to the frequency converter, activation of the braking control |
| S4: | time control 1 |
| S5: | delay control |
| S6: | brake travel control |
| S7: | speed control |
| S8: | undesired reversal of travel direction, excess speed |
| S9: | monitoring of the second channel 9 |
| S10: | time control 2 |
| S11: | frequency converter disturbance |
| S12: | phase failure |
| S13: | undesired travel direction reversal, excess speed |
| S14: | monitoring of the first channel 8 |
| S15: | bridging-over controlled to off |
| S16: | drive circuitbreakers drop out |
| S17: | holding brake engaged |
| S18: | conveying equipment for persons stationary |

The sequence can in this example be summarised as follows:

If during normal operation of the conveying equipment for persons a safety circuit interruption is established (step S2), then a stop command is given to the frequency converter 3 so that the frequency converter can undertake electrical braking (step S3). At the same time, the drive safety circuit is activated, which monitors the braking process by way of the first channel 8 and the second channel 9. If any error in the monitoring parameters of the channels 8, 9 is established, then the bridging-over by way of the frequency converter 3 is controlled to off (step S15). The drive circuitbreakers 5 drop out (step S16) and the holding brake 2 engages (step S17). The conveying equipment for persons stops (step S18).

We claim:

1. A method for stopping conveying equipment for persons, wherein on response of a safety element a braking process performed by a frequency converter co-operating with a drive motor is initiated, by means of which the conveying equipment for persons is brought to a standstill, characterized in that the braking process is monitored by a drive safety circuit which comprises at least a first channel and a second channel, each of the first and second channels being capable of independently issuing a brake control signal and having means for monitoring the actions of the other.

2. The method according to claim 1, characterized in that the first channel is provided with a first processor control and a second channel is provided with a second processor control.

3. The method according to claim 1 or 2, characterized in that a check cycle of an operating means is carried out by a comparison unit separate from the first channel and from the second channel.

4. The method according to claim 3, characterized in that the comparison unit obtains data with respect to the switching state of a first channel and a second channel by way of an input.

5. The method according to claim 1 or 2, characterized in that at least the first channel and the second channel exchange data by way of a bus system.

6. A safety circuit for monitoring a braking device for stopping conveying equipment for persons, wherein on response of a safety element a braking process performed by a frequency converter co-operating with a drive motor is initiated, by means of which the conveying equipment for persons is brought to a standstill, characterized in that the safety circuit comprises at least a first channel and a second channel, each of the first and second channels being capable of independently issuing a brake control signal and having means for monitoring the actions of the other.

7. The safety circuit according to claim 6, characterized in that a bus system is provided, by way of which at least the first channel and the second channel exchange data.

8. The safety circuit according to claim 6, characterized in that a comparison unit is provided, which receives data with respect to the switching state of the first channel and the second channel by way of at least one of input and a control which is disposed in operative connection with the frequency converter.

* * * * *